United States Patent [19]

Estkowski et al.

[11] Patent Number: 4,696,394
[45] Date of Patent: Sep. 29, 1987

[54] EASILY REMOVABLE PROTECTIVE COVERING FOR ANNULAR OBJECTS

[75] Inventors: Michael H. Estkowski; Robert S. Doumani, both of St. Joseph; Christopher G. Estkowski, Coloma, all of Mich.

[73] Assignee: Shepherd Products U.S., Inc., St. Joseph, Mich.

[21] Appl. No.: 927,534

[22] Filed: Nov. 5, 1986

Related U.S. Application Data

[63] Continuation-in-part of Ser. No. 800,754, Nov. 22, 1985, abandoned.

[51] Int. Cl.$^4$ .................. B65D 37/00; B65D 85/02
[52] U.S. Cl. .................. 206/303; 206/445; 206/497; 206/608; 229/87 R
[58] Field of Search .................. 53/409, 442; 206/0.8, 206/303, 445, 497, 608–613; 229/87 C, 87 R, 87.2

[56] References Cited

U.S. PATENT DOCUMENTS

| | | | |
|---|---|---|---|
| 3,005,542 | 10/1961 | Harrison . | |
| 3,187,478 | 6/1965 | Kirkpatrick . | |
| 3,203,543 | 8/1965 | Taylor, Jr. et al. . | |
| 3,257,067 | 6/1966 | Buttery et al. | 206/608 |
| 3,289,385 | 12/1966 | Syverson et al. | 53/442 |
| 3,311,032 | 3/1967 | Lucas | 206/445 |
| 3,331,105 | 7/1967 | Gordon | 24/16 |
| 3,358,902 | 12/1967 | Emmert et al. | 229/43 |
| 3,528,825 | 9/1970 | Doughty | 53/442 |
| 4,377,234 | 3/1983 | Kaplan | 206/432 |
| 4,384,644 | 5/1983 | Uchida | 206/611 |

FOREIGN PATENT DOCUMENTS

| | | | |
|---|---|---|---|
| 0227982 | 2/1959 | Australia | 206/303 |
| 0042982 | 1/1982 | European Pat. Off. | 206/608 |
| 0352938 | 4/1961 | Switzerland | 206/303 |
| 1277468 | 6/1972 | United Kingdom | 206/303 |

Primary Examiner—Jimmy G. Foster
Attorney, Agent, or Firm—Mann, McWilliams, Zummer & Sweeney

[57] ABSTRACT

A protective covering for annular objects, such as caster wheels, which covering consists of a continuous band of heat-shrinkable plastic material defining spaced marginal edges thereabout, which band is proportioned thereabout to be closely received over and about the tread of the caster wheel in overlapping relation to the wheel along both side edges of the wheel tread, for heat shrinking thereagainst, whereby the band is tensioned against the wheel tread, and the wheel tread side edges, in protective relation to the tread, which band is formed to provide what becomes a tear or release strip that functions to sever the band, when removal of the covering is desired, from one side edge of the band to the other. When removal of the covering from the wheel tread is desired, the tear strip is created by pulling or peeling a designated portion of the covering laterally outwardly of the wheel tread, and from one side edge of the covering to the other side edge of same, to sever the protective covering, which covering then springs free of the wheel tread. A method is disclosed for application of the protective covering over the wheel tread.

2 Claims, 9 Drawing Figures

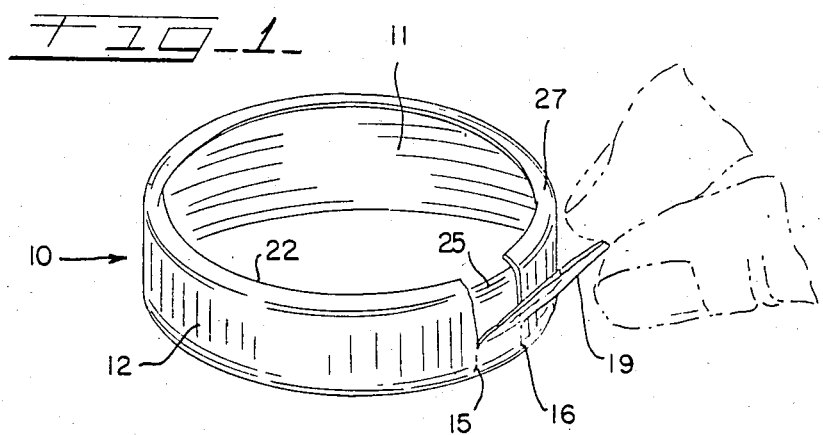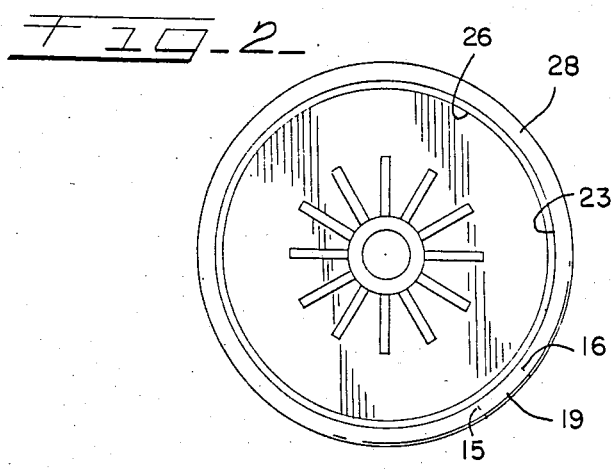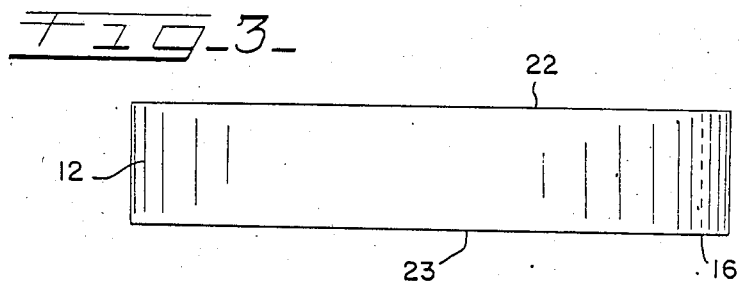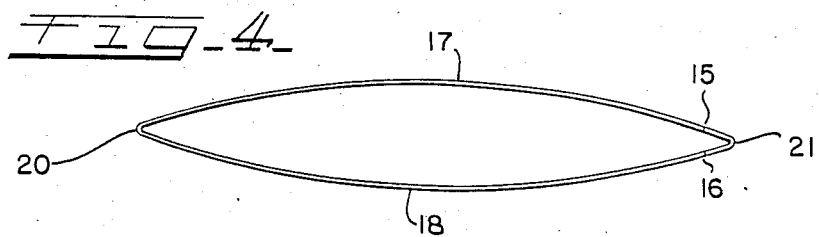

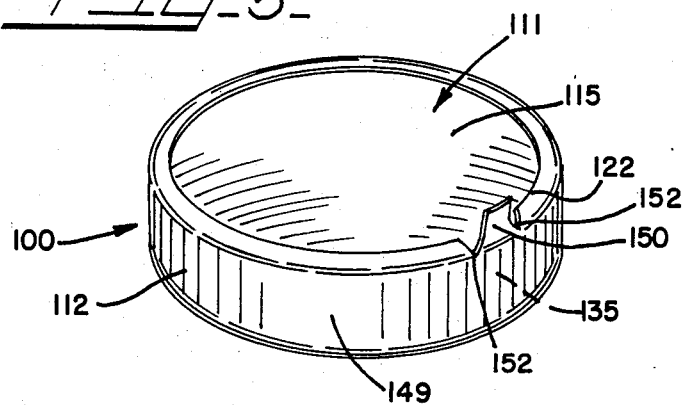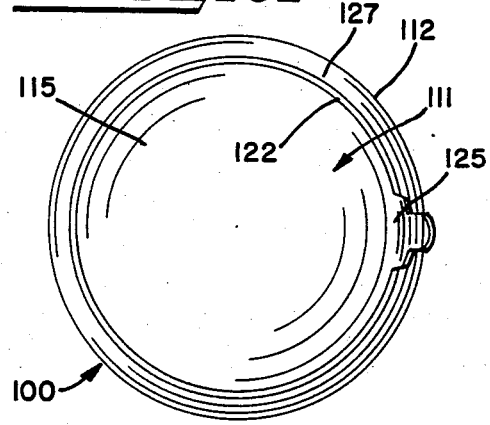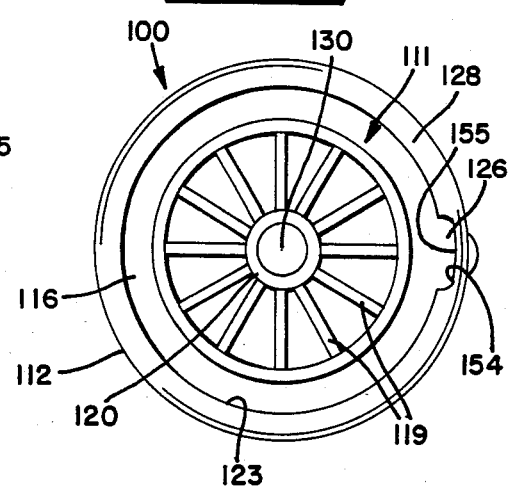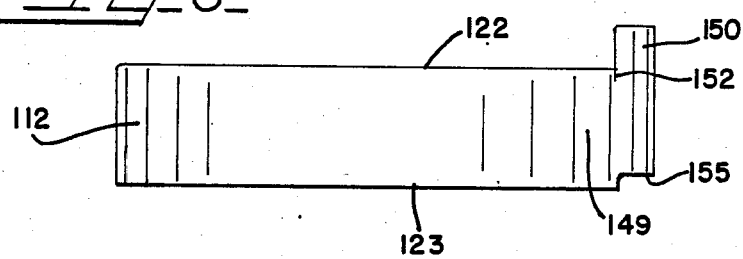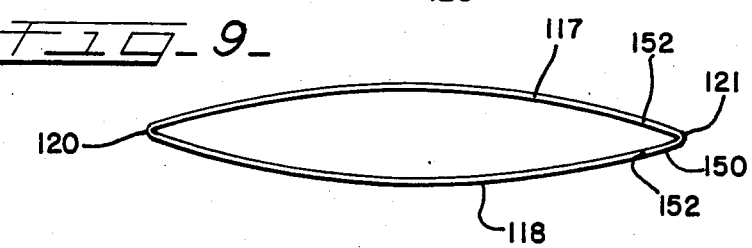

EASILY REMOVABLE PROTECTIVE COVERING FOR ANNULAR OBJECTS

BACKGROUND OF THE INVENTION

This application is a continuation-in-part of the patent application Ser. No. 800,754, filed Nov. 22, 1985, abandoned.

Many devices in the form of annular objects, such as caster wheels, are made available on the market which require a protective covering for the wheel tread during storage or shipping, or both, which covering is to be removed when the product is placed in service. Typical of such coverings are the wrappings used for automobile tires, as disclosed in U.S. Pat. Nos. 3,005,542 and 3,203,543. A temporary covering for paper cups is disclosed in U.S. Pat. No. 3,187,478. Temporary closures which utilize heat-shrink plastics are shown in U.S. Pat. Nos. 3,331,105, 3,358,902, and 4,377,234. A shrink wrapped sausage casing is shown in U.S. Pat. No. 3,528,825 and a package for cups is shown in U.S. Pat. No. 3,289,385. Of general interest are the packages shown in British Pat. No. 1,277,468, Australian Pat. No. 227,982 and Swiss Pat. No. 352,938.

Also typical of the prior art is a temporary protective caster wheel covering sold by the Assignee of the instant application under the registered trademark TRED-GARD. This device is a molded plastic ring designed to be snapped over a caster wheel. When the caster wheel is to be placed in service, the ring is snapped off the wheel to expose the wheel tread. This device is illustrated in Form No. FA583 of Shepherd Products U.S. Inc.

SUMMARY OF THE INVENTION

The present invention provides a protective covering in the nature of a band for furniture caster wheels or the like, which covering is formed from heat-shrinkable polyvinyl chloride in a size which provides a covering that can be used for a range of appropriate caster wheel sizes. The band forming the protective covering is formed to define an easy release mechanism therefor consisting of a portion of the covering at a specific location on its perimeter being formed to provide a tear strip that, when created in accordance with the present invention extends between the side edges of the band, across the width of the band, to sever same. The method of protecting caster wheels of the present invention includes the steps of placing the band forming the protective covering of the present invention over the tread of the caster wheels, in overlapping relation to the side edges of same, and applying heat to the band for a sufficient length of time that will effect shrinking of the band over the caster wheel tread to be protected sufficient to place the band in tension. When the caster wheel is to be placed in service, the tear strip of the protective wheel periphery or rim cover is peeled across the band forming the protective covering, allowing easy removal of the protective covering due to the tension it is under and without the need or use of knives or tools to remove the protective covering from the caster wheel.

BRIEF DESCRIPTION OF THE DRAWINGS

FIG. 1 is a perspective view of one embodiment of the protective covering of the present invention, as applied on a caster wheel about its periphery or tread, with the caster wheel being disposed so that its outer side faces upwardly;

FIG. 2 is a bottom plan view of the assembled caster wheel and protective covering shown in FIG. 1;

FIG. 3 is a side elevational view of the protective covering itself (the embodiment of FIGS. 1 and 2), with the protective covering being shown in its unassembled state;

FIG. 4 is a top plan view of the protective covering as shown in FIG. 3, with FIG. 4 also being representative of a bottom plan view of the protective covering;

FIG. 5 is a view similar to that of FIG. 1, but showing a modified embodiment of the invention as applied to the tread of a caster wheel;

FIG. 6 is a top plan view of the caster wheel and protective covering of FIG. 5;

FIG. 7 is a bottom plan view of the assembled caster wheel and protective cover of FIGS. 5 and 6;

FIG. 8 is a view similar to that of FIG. 3, but showing the embodiment of FIGS. 5-7; and FIG. 9 is a top plan view of the protective cover of FIGS. 5-8.

DETAILED DESCRIPTION OF THE INVENTION

Referring first to the embodiment of FIGS. 1-4, this embodiment of the invention is concerned with a protective covering 10 adapted to be applied over the periphery of an annular object 11, such as, for example, the tread of a caster wheel or other similar object, in gripping and overlapping relation thereto.

For the purpose of maintaining a clean appearance of caster wheels prior to use in final service locations, it has become the practice of manufacturers who supply casters and the wheels therefor to cover the wheel treads with temporary coverings designed to be removed by the customer when the caster wheel is to be put in service. The function of such temporary covering is to cover and protect the wheel, especially its tread, from dirt or other debris, so as to maintain a clean appearance of the wheel and prevent the wheel from transmitting dirt or the like to a rug, carpeting, or other decorative surface that the caster wheel will be placed against, in use.

The covering 10 of the embodiment of FIGS. 1-4 comprises a continuous band 12 formed of heat-shrinkable polyvinyl chloride plastic material, which band 12 is shaped to define continuous side edges 22 and 23. The thickness of the band or sleeve 12 can be in the range of from about 0.004 inch to about 0.012 inch, with the preferred forms tending toward the upper end of this indicated range of thicknesses. One form of the present invention arranged in accordance with the embodiment of FIGS. 1-4 has been successfully tested is made from heat-shrinkable polyvinyl chloride sold by Gilbreth International Corp. under the trademark SKINTIGHT in the form of seamed polyvinyl chloride.

The band 12 forming the protective covering 10 can be formed initially in long, flat sheets, and cut to desired widths. The band 12 of FIGS. 1-4 is formed to define a pair of closely spaced lines 15 and 16 of perforations, which lines 15 and 16 extend rectilinearly and in substantial parallelism from one edge 22 to the other edge 23 of the band or sleeve 12, and thus transversely of the protective covering 10. The lines of perforations 15 and 16, which are in the nature of score lines, are parallel to each other and are disposed in closely spaced relation so as to define what is, in effect, a release mechanism integral with the protective covering 10 for easy removal of the protective covering 10 from the tread or perhiphery of the wheel 11, when desired.

The individual bands 12 in their unassembled or unapplied relation assume a somewhat elongated shape, as best shown in FIG. 4. Each band 12 comprises segments 17 and 18 integrally joined at the ends 20 and 21 of the covering 10 to form one continuous member with the score lines 15 and 16 being disposed, in the embodiment of FIGS. 1–4, adjacent, and on either side of, the end 21, although lines 15 and 16 could obviously be formed at any location along the periphery of band 12. An integral tear strip 19 is thus defined by and between the lines 15 and 16, which is integrally connected within the protective covering 10 until strip 19 is created and removed from the band 12 to sever the protective covering 10 that is tensioned about the caster wheel 11, as hereinafter disclosed.

The ends 20 and 21 are creased in a manner such that the integral segments 17 and 18 thereof are spaced somewhat away from each other. It will therefore be seen that slight pressure applied to the respective ends 20 and 21 of the band 12, urging such ends 20 and 21 toward each other, will facilitate the spreading of the band segments 17 and 18 from each other, causing the band to form a generally circular shape that includes upper edge 22 and lower edge 23 (assuming that the protective covering is disposed horizontally), in which relation the protective covering is adapted to be received over and about the tread of a caster wheel 11, as will be hereinafter disclosed.

The protective covering 10 of FIGS. 1–4 may be employed to provide temporary protection for the tread or rim of a caster wheel, as indicated hereinbefore, and between the time of manufacture of the wheel, and the time when the wheel and the furniture or the like which the wheel is to support, is placed into use.

In applying the covering 10 of FIG. 1–4 to the caster wheel 11, the caster wheel may be positioned on a work table or the like, or in one's hand for covering. As indicated, to flex the elongated covering 10 to its essentially circular relation, finger pressure is applied to the exterior of both ends 20 and 21 of the band 12, and in opposite directions. The band integral segments 17 and 18 are thereby spread apart sufficiently to allow disposing of the band over and about the tread of the wheel 12. In this connection, the band is proportioned between edges 22 and 23 so that when the tread of wheel 11 is contained in centered relation within the covering 10, the covering upper edge 22 and the covering lower edge 23 respectively overlap the corresponding upper and lower edges 25 and 26 of the tread of the caster wheel 11.

The covering 10 in its unheated state is preferably dimensioned relative to the caster wheels 11 it is to be applied to so that it will grip the wheel 11 in order to provide proper shrinkage and containment during the heating process. The indicated operation of applying a covering 10 to a wheel 11 can be accomplished automatically by utilizing conventional machines available in the market place.

The caster wheel 11 with the covering 10 applied thereto as indicated is then disposed in a suitable heated environment for a sufficient length of time to cause the entire periphery of the sleeve or band 12 to shrink until the band is placed in tension with the inner surfacing periphery of the band firmly and securely gripping the outer surfacing periphery or tread of the caster wheel 11. The upper edge 22 of the covering 10 shrinks over the upper edge 25 of the wheel tread to form a radially inwardly extending flange 27, while the lower edge 23 of the band 12 shrinks to overlie the lower edge of the tread of the wheel 11 so as to define a radially inwardly extending flange 28. This configuration of the heat shrunk covering 10 retains it on the wheel 11 to which it has been applied pursuant to this disclosure.

When the band 12 is shrunk to occupy the position shown in FIG. 1 relative to the caster wheel tread, the application of the covering 10 to the caster wheel is complete. The wheel 11 may then be stored in inventory for indefinite periods of time, either in its unassembled state or it may be assembled on an axle to form a caster unit. At some time caster units, as so assembled, are suitably affixed to an article, such as a piece of furniture, to be rollably supported thereby. The band 12 continues to cover and protect the caster wheel from dirt or other debris, so long as the covering 10 remains applied thereto, maintaining a clean appearance of the wheel and preventing the wheel from transmitting dirt to a carpet, rug, or other decorative surface upon which it may be placed to rollably support furniture or the like.

When the article of furniture or the like to which the caster wheel is applied is to be placed in service, it is a simple matter, in accordance with the present invention, to easily remove the protective covering 10 from the caster wheel. For this purpose, the portion of the band 12 disposed between the score lines 15 and 16 is finger gripped at, for instance, the edge 22 of the covering 10, and pulled away from the caster wheel and then across the caster wheel tread through its edge 23 thereof to create release strip 19 and sever the band 12 at score lines 15 and 16, and between the covering edges 22 and 23. For purposes of this disclosure, the end of the tear strip 19, that is to be formed by the covering removal action referred to, is shown disposed at the edge 22 (which encircles the outer side of the caster wheel 11) and is designated the "upper end" of the tear strip. As will be apparent, it takes only a relatively minor pulling action or force to initially form the release strip 19 along the perforated lines 15 and 16, and pull same away from the wheel 11, until the release strip is fully formed and disassociated from the band 12, including both of its edges 22 and 23, whereby the sleeve or band is severed. Since the band 12 is in a state of tension as applied to wheel 11, due to its shrinking over the wheel tread, the ends of the band 12 spring away from the wheel, when severed, and is thus easily removed and discarded, providing a clean wheel tread or rim surface to contact the carpeting or other flooring on which the caster wheel is to rest or ride or both.

The length of the individual perforations which comprise the score lines 15 and 16 may be adjusted depending on the thickness of the plastic film material making up the band 12, and the predetermined force which is desired for the formation and separation of the release strip 19 from the band 12, to sever same for full release from the caster wheel tread. Of course, the release strip 19 may be created by starting the pulling and peeling action at edge 23 and pulling the resulting strip 19 through covering edge 22, with the same snap free release effect of the covering 10 from wheel 11 being effected.

Referring now to the modified embodiment of FIGS. 5–9, which is the preferred mode of practicing the invention, reference numeral 100 generally indicates a protective covering formed from the same heat shrinkable material as the covering 10 (of FIGS. 1-4) applied to a caster wheel 111 that is generally similar to that to which the protective covering 10 is applied.

The caster wheel 111 defines the usual outwardly facing side 115 that faces uppermost in the showing of FIGS. 5 and 6, and the usual inwardly facing side 116 that is shown in FIG. 7, which may include the usual reinforcing ribs 119 and the centrally located caster axle receiving sleeve 120 that are comparable to the corresponding conventional structural caster wheel features that are shown in FIG. 2 (wheel 111 receiving in its sleeve 120 a suitable axle that journals it for rolling rotation about axis 130). The tread of the wheels illustrated in FIGS. 1-9 is coaxially oriented relative to axis 130, as is well known in the art.

As was the case in connection with the protective covering 10, the covering 100 is in the form of a continuous band 112 formed from heat-shrinkable polyvinyl chloride plastic material, with the thickness of the heat-shrinkable material involved being in the range of from about 0.004 inches to about 0.012 inches (with the upper end of the range of thickness being preferred).

Similar to the band 12, the band 112 can be formed initially in long flat sheets, and cut to desired widths. Thus, the band 112 of FIGS. 5-9 in its unassembled or unapplied state assumes a somewhat oblong shape, as best shown in FIG. 9. Each band 112 comprises segments 117 and 118 integrally joined at ends 120 and 121 of the band 112 to form one continuous band.I The ends 120 and 121 are creased similar to the corresponding ends 20 and 21 of the band 12 such that the segments 117 and 118 are spaced slightly away from each other in the normal relation of the band 112 prior to its application to a caster wheel 111. It will be readily apparent that slight finger pressure applied externally to the band ends 120 and 121, in opposite directions, urging such ends 120 and 121 toward each other, will facilitate spreading of the band segments 117 and 118 from each other to bring the band or sleeve 112 into a generally circular shape defining edge 122 and edge 123, and disposing the band 112 in relation to receive the caster wheel 111 in a manner similar to that previously described in connection with band or sleeve 12.

The band 112 of the embodiment of FIGS. 5-9 omits the score lines 15 and 16 of the embodiment of FIGS. 1-4, and at a suitable location along the length of the band 112 the release mechanism provided therefor comprises peel tab 150 that projects away from the periphery 149 of the band 112, and that has formed on either side of same at the band edge from which the tab 150 projects a pair of guiding slits 152 (see FIGS. 5 and 8) to weaken the marginal edging of the band 112, on either side of the peel tab 150, to facilitate release of the band 112 from the caster wheel 111.

The band 112 is also formed on the other side edge of same with a notch 154 that is aligned with the peel tab 150 transversely of the periphery 149 of the band 112.

In the embodiment of FIGS. 5-9, the peel tab 150 and the peel facilitating slits 152 are shown formed in the side edge 122 of the band 112, ahd the notch 154 is shown formed in the side 123 but this positioning can be reversed without adversely effecting the viability of the protective covering 100, as will be immediately apparent to those skilled in the art.

Similar to the protective covering 10, the protective covering 100 of FIGS. 5-9 is used to provide temporary protection for the tread or rim of the caster wheel 111 or other similar annular object, between the time of manufacture and the time when the wheel and the furniture or the like it supports is placed into use.

The wheel 111 that is to have its tread covered by band 112 may be positioned on a work table or in one's hand for covering, with the outwardly facing side 115 of the wheel 111 preferably facing upwardly. Finger pressure in the nature of compression is applied in opposite directions at both ends 120 and 121 of the band 112 such that the band segments 117 and 118 are spread apart a sufficient distance to allow positioning of the band over the periphery or rim of the caster wheel 111. This can also be done automatically by machines available in the market place, as described hereinbefore. In the showing of FIGS. 5-7, this is done with the band side edge 122 disposed adjacent the indicated upwardly facing side 115 of the caster wheel, so that the peel tab 150 projects upwardly. The proportioning of the band 112 relative to the tread of the caster wheel 111, and the positioning of the protective covering 100 relative to the wheel 111, is made such that the edge 122 and 123 respectively overlap the corresponding upper and lower edges 125 and 126 of the caster wheel 111.

The thus assembled protective coating 100 and caster wheel 111 then are to be exposed to a suitable amount of heat, in any suitable manner, such as being cycled through a medium temperature oven of a suitable nature, with the exposure to heat being for a sufficient amount of time to cause the entire periphery 149 of the band 112 to shrink until the band is placed in tension with the inner surfacing periphery of the band 112 firmly and securely gripping the outer surfacing periphery or rim of the wheel 111, with the edge 122 of the band 112 shrinking over the upper edge 125 of the caster wheel 111 to form a radially inwardly extending flange 127, and the other edge 123 of the band 112 shrinking to overlie the edge 126 of the caster wheel 111 so as to define a separate radially inwardly extending flange 128.

When the band 112 has the relationship with respect to the caster wheel that is shown in FIGS. 5-7, the application of the band 112 to the wheel 111 is complete.

When an article of furniture or the like bearing casters having wheels 111 is to be placed in service, the protective covering 100 is removed from each wheel 111. To do this, it is a simple matter, due to the construction of the embodiment of FIGS. 5-9, for the individual to easily remove the protective covering 100. The individual exposes the caster wheel 111 in question, finger grips the peel tab 150, and pulls the peel tab 150 outwardly away from the wheel periphery edge 125 and the covering side edge 122, across the periphery 149 of the protective covering 100, and through notch 154 thereof that is formed in the edge 123 of the covering 100. This results in the peel tab 150 forming a separate release strip (indicated in FIG. 5 by the dashed lead line for reference numeral 135) that has a length that includes the transverse dimension of the protective covering periphery 149 up to the portion of the covering that defines notch 154, so that the protective band 112 is fully severed at the location of the peel tab 150 and the resulting release strip 135 (that is formed out of the protective covering 110 to release same from the caster wheel). Since the band 112 is under tension, on removal of the release strip 135, the remaining part of the protective covering springs away from the wheel tread, and is thus easily removed and discarded, allowing a clean wheel tread or rim surface to contact the carpeting or other flooring on which the casters rollably ride.

The notch 154 facilitates the removal of the protective covering 100 from a caster wheel 111, by its presence, which is in one of the edges of the band 112, for instance, edge 123, that forms the tensioned flange 128. The notch 154 is preferably proportioned such that removal of enough of the covering forming material making up the band 112 is such that the flange 128 is void for approximately 50 per cent of its radial length, in the position flange 128 assumes as shrunk on wheel 111, and for a dimension circumferentially of flange 128 that is aligned with the peel tab 150 transversely of the periphery 149 of the covering 110. In this connection, the transverse dimension of the covering periphery 149 that is referred to is the dimension that parallels the axis 130 of rotation of the wheel 111 to which the covering 100 is applied.

In addition to the removal of the material making up the protective covering 100 by the formation of the notch 154, which results in decreasing the strength of the polyvinyl chloride material at the flange 128 (or flange 127 if the positions of peel tab 150, slits 152 and notch 154 are reversed), the force that is to be applied to the peel tab 150 to separate the resulting release strip 135 from the band 112 at the location of the notch 154, can be so applied so that the resulting release strip 135 is angled at least at 90 degrees with respect to the margin 155 of the groove 154 that is concentric with the periphery 149 of the covering 100 as applied to wheel 111.

As has already been indicated, the peel tab 150, its associated slits 152, and the notch 154 may alternately be formed along the respective covering side edges 122 and 123, respectively, with positioning opposite to that shown in FIGS. 5-7, as will be apparent to those skilled in the art.

The protective coverings 10 and 100 provided by the present invention make available, to the manufacturer and/or supplier of caster wheels and other similar annular objects, a device and method for protecting the wheel thread, or corresponding structure in other annular objects, in an inexpensive, and yet completely satisfactory fashion, while, at the same time, permitting easy and ready removability of the protective covering when desired, and without the need for any tools whatsoever.

The particular composition of the bands that form the respective protective coverings, namely heat-shrinkable polyvinyl chloride, provides an exterior surface that is readily adaptable for printing in order that suitable advertising or promotional material, slogans, or trademarks or the like, may be imprinted thereon.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. A protective covering for a caster wheel tread comprising a continuous band of heat-shrinkable polyvinyl chloride defining spaced marginal side edges thereabout, said band being proportioned to be closely received over and about the wheel tread in overlapping relation to the wheel along both side edges of the wheel tread for heat shrinking thereagainst and thereabout, whereby said band including said side edges thereof will be tensioned against the wheel tread and the wheel tread side edges respectively, when the wheel is centered within said protective covering and said protective covering is heat shrunk against such wheel tread, said band including release means formed perpendicular to its periphery for effecting finger gripping of one side edge thereof and pulling free of said band between said side edges thereof for severing said band whereby the severed band under said tension springs away from the wheel tread when such section is formed, said release means including an upstanding finger grip tab extending from one of said edges thereof, said tab being integral with said band and extending laterally of said band, and a pair of tear slits formed in said band, one disposed on either side of said tab at said one of said edges of said band, said slits being directed toward the other of said edges of said band, and a tear notch formed in said band at said other of said edges of said band, said notch being aligned with said tab.

2. The protective covering set forth in claim 1 wherein:

said tear notch being of uniform dimension longitudinally of said band, with said dimension of said notch approximating, and being aligned with the corresponding dimension of said tab.

* * * * *